(12) United States Patent
Woo et al.

(10) Patent No.: US 11,591,746 B2
(45) Date of Patent: Feb. 28, 2023

(54) CLOTHES CARE APPARATUS AND CONTROL METHOD THEREOF

(71) Applicant: SAMSUNG ELECTRONICS CO., LTD., Suwon-si (KR)

(72) Inventors: Ji Hyun Woo, Suwon-si (KR); Sang Yeon Pyo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 180 days.

(21) Appl. No.: 16/556,942

(22) Filed: Aug. 30, 2019

(65) Prior Publication Data

US 2020/0071875 A1 Mar. 5, 2020

(30) Foreign Application Priority Data

Aug. 31, 2018 (KR) .................... 10-2018-0104007

(51) Int. Cl.
*D06F 73/02* (2006.01)
*D06F 58/10* (2006.01)
*D06F 105/28* (2020.01)

(52) U.S. Cl.
CPC .............. *D06F 73/02* (2013.01); *D06F 58/10* (2013.01); *D06F 2105/28* (2020.02)

(58) Field of Classification Search
CPC .............. D06F 58/203; D06F 2103/32; D06F 2105/32; D06F 58/10; D06F 2105/30;
(Continued)

(56) References Cited

U.S. PATENT DOCUMENTS 3,576,079 A * 4/1971 Hauser .................... D06F 73/02
34/68
3,739,496 A * 6/1973 Buckley .................. D06F 73/02
312/271
(Continued)

FOREIGN PATENT DOCUMENTS

CN 1170061 A 1/1998
CN 101240501 A 8/2008
(Continued)

OTHER PUBLICATIONS

International Search Report dated Dec. 12, 2019 from International Patent Application No. PCT/KR2019/011083, 3 pages.
(Continued)

*Primary Examiner* — David G Cormier
*Assistant Examiner* — Thomas Bucci
(74) *Attorney, Agent, or Firm* — Staas & Halsey LLP

(57) ABSTRACT

A clothes care apparatus includes a chamber, an upper fan provided above the chamber and configured to move air to a lower side of the chamber, and a lower fan provided under the chamber and configured to move air to an upper side of the chamber. A first motor is configured to rotate the lower fan and a steam generating device is configured to generate steam by heating water. A controller is configured to control on-off states of the steam generating device and the first motor, configured to turn on the steam generating device in a first period for supplying the generated steam to the chamber, and configured to turn on the first motor in a second period for allowing the steam to be dispersed by air moving to the chamber.

7 Claims, 11 Drawing Sheets

(58) Field of Classification Search
CPC ............... D06F 2105/38; D06F 39/008; D06F 2101/04; D06F 2101/06; D06F 34/26; D06F 73/02; D06F 2105/40; D06F 2202/04; D06F 2105/28
USPC .......................................................... 68/5 C
See application file for complete search history.

(56) References Cited

U.S. PATENT DOCUMENTS

| | | | | |
|---|---|---|---|---|
| 3,805,561 A * | 4/1974 | Bullock | ............... | D06F 73/02 223/51 |
| 5,305,484 A * | 4/1994 | Fitzpatrick | ............ | D06F 73/02 68/6 |
| 5,815,961 A * | 10/1998 | Estes | .................. | D06F 73/02 38/14 |
| 6,189,346 B1 * | 2/2001 | Chen | .................... | D06F 73/02 68/5 R |
| 6,425,192 B2 * | 7/2002 | Arrieta | .................. | D06F 73/02 34/571 |
| 6,925,737 B2 * | 8/2005 | Bolduan | ................ | D06F 73/02 38/14 |
| 7,140,121 B2 * | 11/2006 | Casella | ................. | D06F 58/10 34/201 |
| 7,367,137 B2 * | 5/2008 | Jonsson | ................. | D06F 58/10 34/265 |
| 8,006,336 B1 * | 8/2011 | Gerlach | ................. | B05B 5/03 68/5 R |
| 8,136,273 B2 * | 3/2012 | Kim | ..................... | D06F 58/10 38/14 |
| 8,146,390 B2 * | 4/2012 | Moon | .................... | D06F 73/02 68/213 |
| 8,302,326 B2 | 11/2012 | Lee | | |
| 8,424,220 B2 * | 4/2013 | Bae | ....................... | D06F 58/30 68/5 R |
| 8,484,860 B2 * | 7/2013 | Moon | .................... | D06F 58/10 38/14 |
| 8,522,450 B2 * | 9/2013 | Moon | .................... | D06F 58/10 34/264 |
| 8,695,228 B2 * | 4/2014 | Lee | ........................ | D06F 73/02 34/610 |
| 9,096,969 B2 * | 8/2015 | Moon | ................. | D06F 58/203 |
| 9,194,076 B2 | 11/2015 | Son et al. | | |
| 9,267,229 B2 | 2/2016 | Oh et al. | | |
| 9,309,618 B2 * | 4/2016 | Park | .................. | D06F 58/10 |
| 9,359,717 B2 * | 6/2016 | Lim | ................... | D06F 58/10 |
| 9,506,185 B2 * | 11/2016 | Choi | ................. | D06F 58/203 |
| 2001/0037590 A1 * | 11/2001 | MacGregor | ......... | D06F 73/02 38/3 |
| 2003/0126691 A1 * | 7/2003 | Gerlach | ................ | D06F 58/10 8/158 |
| 2004/0163184 A1 * | 8/2004 | Waldron | ............... | D06F 73/02 68/5 R |
| 2004/0187529 A1 * | 9/2004 | Kim | ..................... | D06F 39/088 68/147 |
| 2004/0237603 A1 * | 12/2004 | Kim | ..................... | D06F 39/083 68/58 |
| 2005/0262644 A1 * | 12/2005 | Oak | ........................ | D06F 33/65 68/5 R |
| 2006/0005581 A1 * | 1/2006 | Banba | .................. | D06F 25/00 68/5 R |
| 2006/0016020 A1 * | 1/2006 | Park | ..................... | D06F 39/083 68/5 R |
| 2006/0101588 A1 * | 5/2006 | Park | ..................... | D06F 39/008 68/5 R |
| 2006/0101589 A1 * | 5/2006 | Hong | .................... | D06F 25/00 8/158 |
| 2006/0117596 A1 * | 6/2006 | Kim | ..................... | D06F 33/65 34/607 |
| 2006/0137105 A1 * | 6/2006 | Hong | .................... | D06F 58/38 68/19.2 |
| 2006/0277690 A1 * | 12/2006 | Pyo | ..................... | D06F 39/008 8/158 |
| 2007/0227030 A1 * | 10/2007 | Oh | ........................ | D06F 58/44 34/597 |
| 2007/0283507 A1 * | 12/2007 | Wong | .................. | D06F 35/006 8/158 |
| 2008/0000098 A1 * | 1/2008 | Choi | ..................... | D06F 58/30 34/114 |
| 2008/0141553 A1 * | 6/2008 | Son | ..................... | D06F 58/203 34/524 |
| 2008/0141734 A1 * | 6/2008 | Son | ..................... | D06F 34/14 68/5 C |
| 2008/0148493 A1 * | 6/2008 | Hong | .................... | D06F 73/02 8/149.3 |
| 2008/0148494 A1 * | 6/2008 | Son | ........................ | D06F 58/44 137/1 |
| 2008/0148596 A1 * | 6/2008 | Son | ........................ | D06F 58/44 34/486 |
| 2008/0168679 A1 * | 7/2008 | Son | ........................ | D06F 58/44 34/497 |
| 2008/0189978 A1 * | 8/2008 | Aizpuru Borda | ....... | D06F 58/10 312/236 |
| 2008/0209757 A1 * | 9/2008 | Park | ..................... | D06F 58/203 34/524 |
| 2008/0256720 A1 * | 10/2008 | Park | ..................... | D06F 35/006 8/149.3 |
| 2008/0256989 A1 * | 10/2008 | Jeong | ................... | D06F 73/02 392/441 |
| 2009/0064531 A1 * | 3/2009 | Moon | .................... | D06F 58/10 34/218 |
| 2009/0071032 A1 * | 3/2009 | Kreutzfeldt | ........... | D06F 58/44 34/526 |
| 2009/0126421 A1 * | 5/2009 | Kim | ..................... | D06F 73/02 34/182 |
| 2009/0126423 A1 * | 5/2009 | Bae | ..................... | D06F 58/203 68/12.12 |
| 2009/0151205 A1 * | 6/2009 | Kim | ..................... | D06F 58/10 223/51 |
| 2009/0228156 A1 * | 9/2009 | Hong | .................... | D06F 58/10 700/300 |
| 2009/0241269 A1 * | 10/2009 | Yoo | ..................... | D06F 73/02 8/149.3 |
| 2009/0241367 A1 * | 10/2009 | Yoo | ..................... | D06F 58/44 34/493 |
| 2009/0248206 A1 * | 10/2009 | Yoo | ..................... | D06F 58/50 700/275 |
| 2010/0031526 A1 * | 2/2010 | Tuckett | ................ | D06F 58/203 34/215 |
| 2010/0088919 A1 * | 4/2010 | Yang | .................... | F24F 1/06 34/202 |
| 2010/0132129 A1 * | 6/2010 | Moon | .................... | D06F 58/10 68/5 R |
| 2010/0132130 A1 * | 6/2010 | Moon | .................... | D06F 58/10 68/12.27 |
| 2010/0242302 A1 * | 9/2010 | Meschkat | ............ | D06F 58/203 34/357 |
| 2011/0005097 A1 * | 1/2011 | Moon | .................... | D06F 58/206 34/493 |
| 2011/0174022 A1 * | 7/2011 | Ryu | ..................... | D06F 58/10 68/5 C |
| 2012/0017654 A1 * | 1/2012 | Park | ..................... | D06F 73/02 68/5 C |
| 2016/0273153 A1 * | 9/2016 | Nam | .................... | D06F 58/44 |
| 2017/0260681 A1 * | 9/2017 | Gao | .................... | D06F 58/10 |
| 2017/0350066 A1 * | 12/2017 | Kim | .................... | D06F 73/02 |
| 2017/0350067 A1 * | 12/2017 | Choi | .................... | D06F 73/02 |
| 2018/0298549 A1 * | 10/2018 | Nam | .................... | D06F 39/008 |
| 2018/0334767 A1 * | 11/2018 | Kim | .................... | D06B 1/02 |

FOREIGN PATENT DOCUMENTS

| | | |
|---|---|---|
| CN | 101517150 A | 8/2009 |
| CN | 102137970 A | 7/2011 |
| EP | 0 816 552 B1 | 9/2002 |
| JP | 2015-42203 | 3/2015 |
| KR | 10-0510639 B1 | 8/2005 |
| KR | 10-2006-0061974 | 6/2006 |

(56) References Cited

FOREIGN PATENT DOCUMENTS

| | | |
|---|---|---|
| KR | 10-0672340 | 1/2007 |
| KR | 10-1366280 | 2/2014 |
| KR | 10-1572884 B1 | 11/2015 |

OTHER PUBLICATIONS

Extended European Search Report dated Jul. 19, 2021 from European Application No. 19856402.3-1016.
Chinese Office Action dated Oct. 13, 2022 in Chinese Patent Application No. 201980056272.4 (8 pages; 9 pages English translation).
Korean Office Action dated Dec. 12, 2022 in Korean Patent Application No. 10-2018-0104007 (5 pages; 6 pages English translation).

* cited by examiner

FIG. 7

| STEAM OUTLET ANGLE | 50° | 60° | 70° |
|---|---|---|---|
| WATER ADHESION AMOUNT (%) | 3.9 | 5.7 | 3.5 |

FIG. 10

| PERIOD | FIRST PERIOD | SECOND PERIOD | THIRD PERIOD | FOURTH PERIOD |
|---|---|---|---|---|
| OPERATION TIME | 1MINUTE | 2MINUTE | 5MINUTE | 0.5MINUTE |
| BLOWER MOTOR | OFF | OFF | ON | OFF |
| STEAM GENERATING DEVICE | ON | ON | ON | OFF |

CLOTHES CARE APPARATUS AND CONTROL METHOD THEREOF

CROSS-REFERENCE TO RELATED APPLICATION(S)

This application is based on and claims priority under 35 U.S.C. § 119 to Korean Patent Application No. 10-2018-0104007, filed on Aug. 31, 2018, in the Korean Intellectual Property Office, the disclosure of which is incorporated by reference herein in its entirety

BACKGROUND

1. Field

The disclosure relates to a clothes care apparatus capable of removing dust attached to clothes or removing odors from the clothes.

2. Description of Related Art

A clothes care apparatus is a type of device performing clothes care such as drying wet clothes, removing dust attached to the clothes or eliminating remaining odors in the clothes and smoothing creases in the clothes.

The clothes care apparatus may smooth creases in the clothes or eliminate remaining odors in the clothes by supplying air or hot air generated from a blower to the clothes, or by allowing moisture to adhere to the clothes by spraying steam generated from a steam generator.

SUMMARY

Therefore, it is an aspect of the present disclosure to provide a clothes care apparatus capable of performing clothes care functions by generating steam and using the steam, and a control method thereof.

Additional aspects of the present disclosure will be set forth in part in the description which follows and, in part, will be obvious from the description, or may be learned by practice of the present disclosure.

In accordance with an aspect of the disclosure, a clothes care apparatus includes a chamber, an upper fan provided above the chamber and configured to move air to a lower side of the chamber, a lower fan provided under the chamber and configured to move air to an upper side of the chamber, a first motor configured to rotate the lower fan, a steam generating device configured to generate steam by heating water, and a controller configured to control on-off states of the steam generating device and the first motor, configured to turn on the steam generating device in a first period for supplying the generated steam to the chamber, and configured to turn on the first motor in a second period for allowing the steam to be dispersed by air moving to the chamber.

The clothes care apparatus may further include a sensor configured to detect a temperature of the inside of the chamber, and the controller may supply the generated steam to the chamber for a predetermined supply time in the second period, and then drive the first motor until the detected temperature of the inside of the chamber reaches a predetermined temperature.

The controller may turn off the first motor when the detected temperature of the inside of the chamber reaches the predetermined temperature.

The controller may turn off the steam generating device when the detected temperature of the inside of the chamber reaches the predetermined temperature.

The clothes care apparatus may further include a sensor configured to detect a temperature of the water, and the controller may supply the generated steam to the chamber in the first period when the detected temperature of water reaches a predetermined temperature.

The clothes care apparatus may further include an inputter configured to receive information on a course from a user, and in the first period, the controller may determine a supply time for supplying the generated steam to the chamber, based on the information on the course.

The information on the course may include at least one of the type or the number of the clothes accommodated in the chamber.

The controller may turn on the first motor for a predetermined dispersion time in the second period and then turn off the steam generating device and the first motor for a predetermined stabilization time.

The controller may turn off the steam generating device and the first motor in a third period such that the dispersed steam adheres to the clothes.

The controller may turn off the steam generating device and the first motor after the first period or the second period.

The clothes care apparatus may further include a door configured to open and close the chamber, and a steam outlet configured to allow the generated steam to be supplied from the steam generating device to the chamber, and the steam outlet may be formed to be directed to a point where the door is in contact with an upper surface of the chamber.

The steam supplied to the chamber through the steam outlet may be injected to be directed to an edge where the door is in contact with the upper surface of the chamber.

In accordance with another aspect of the disclosure, a control method of a clothes care apparatus includes generating steam by heating water, supplying the generated steam to a chamber for a predetermined supply time, turning on a steam generating device to supply the generated steam to the chamber, and turning on a first motor such that the steam supplied to the chamber is dispersed by air moving into the chamber.

The control method may further include detecting a temperature of the inside of the chamber and supplying the generated steam to the chamber for a predetermined supply time and then driving the first motor until the detected temperature of the inside of the chamber reaches a predetermined temperature.

The driving of the first motor may include turning off the first motor when the detected temperature of the inside of the chamber reaches the predetermined temperature.

The control method may further include turning off the steam generating device when the detected temperature of the inside of the chamber reaches the predetermined temperature.

The control method may further include detecting a temperature of the water, and the supplying of the generated steam to the chamber may include supplying the generated steam to the chamber when the detected temperature of water reaches a predetermined temperature.

The control method may further include receiving information on a course from a user, and the supplying of the generated steam to the chamber may include determining a supply time for supplying the generated steam to the chamber, based on the information on the course, and supplying the generated steam to the chamber for the determined supply time.

The information on the course may include at least one of the type or the number of the clothes accommodated in the chamber.

The control method may further include turning off the steam generating device and the first motor such that the dispersed steam adheres to the clothes.

BRIEF DESCRIPTION OF THE DRAWINGS

These and/or other aspects of the disclosure will become apparent and more readily appreciated from the following description of embodiments, taken in conjunction with the accompanying drawings of which:

FIG. 7 is a table illustrating a water adhesion amount according to an angle of the steam outlet of the clothes care apparatus according to the embodiment of the disclosure;

FIG. 10 is a table illustrating an operation of the clothes care apparatus according to the embodiment of the disclosure.

DETAILED DESCRIPTION

Figure 1:
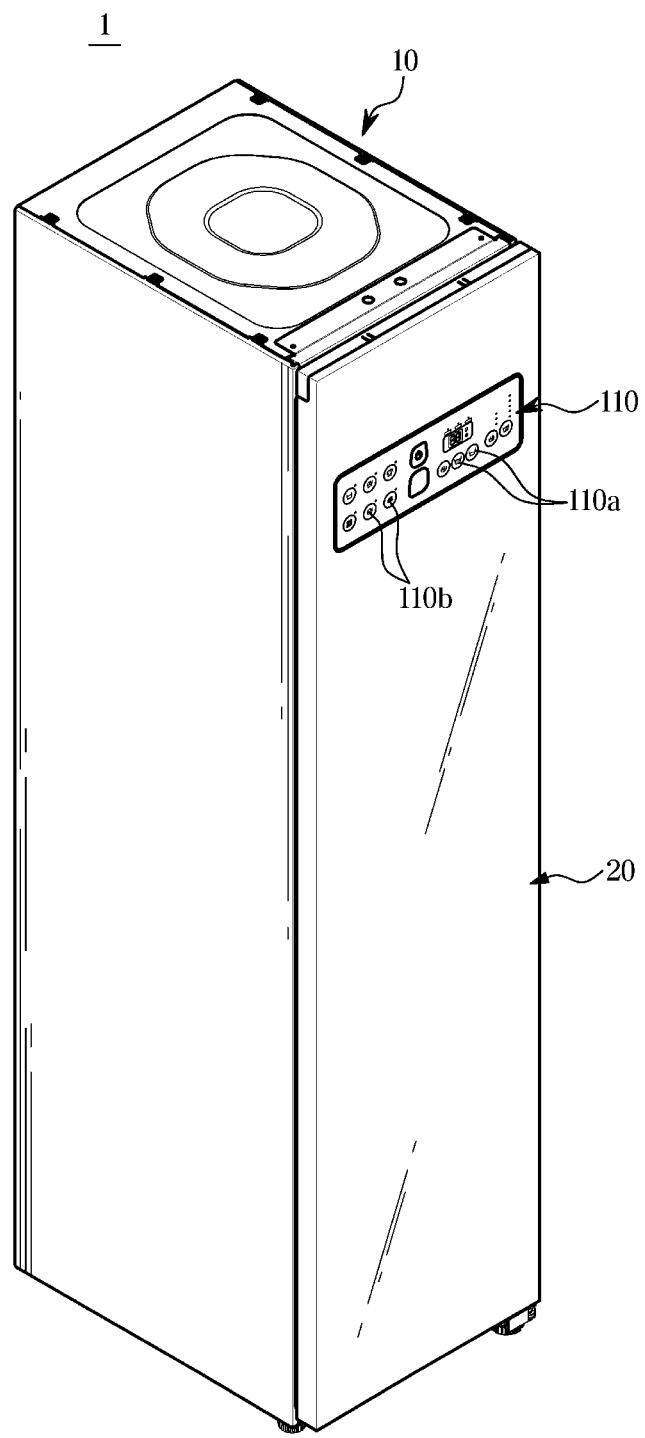
FIG. 1 is a perspective view of a clothes care apparatus according to an embodiment of the disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

Figure 2:
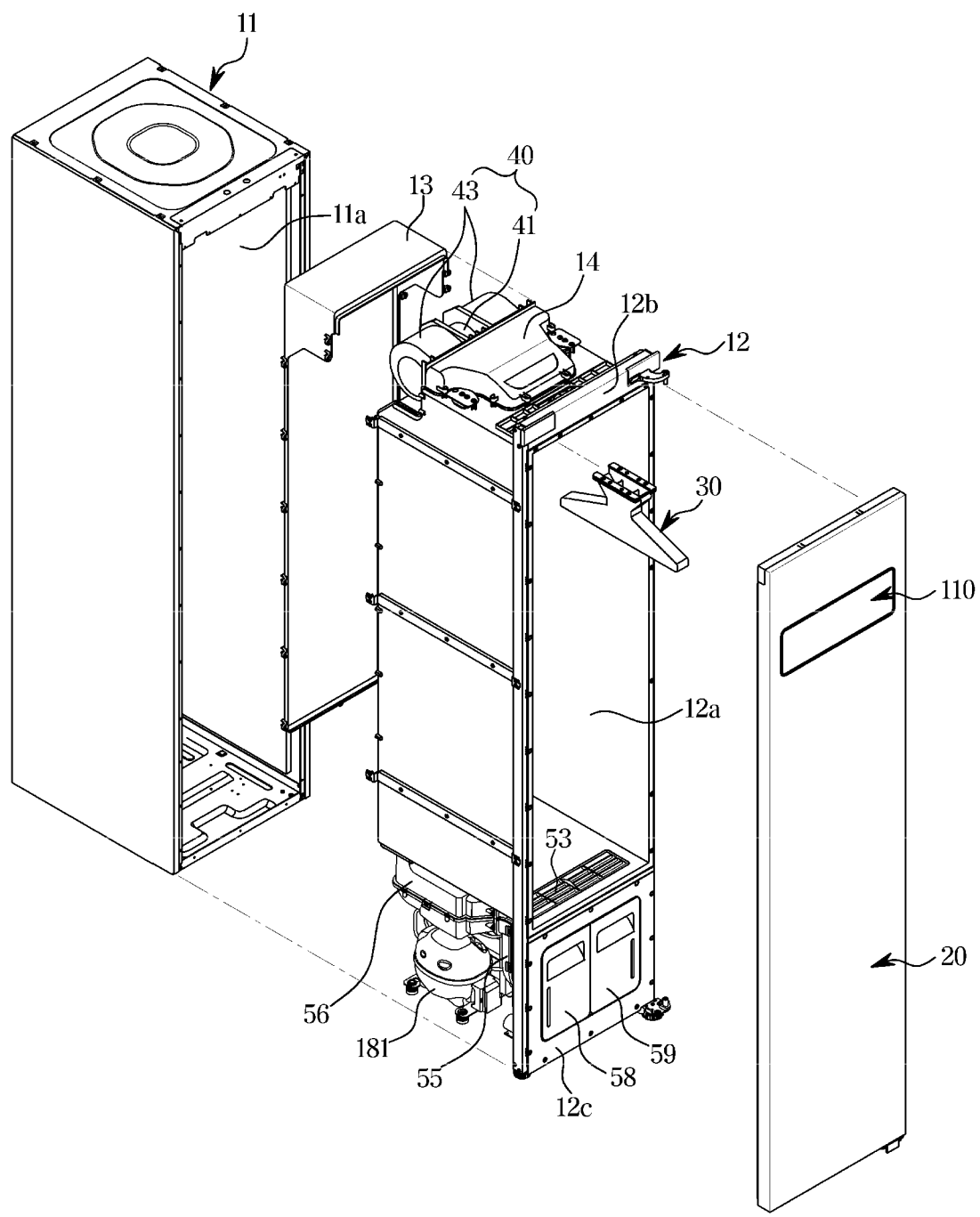
FIG. 2 is an exploded perspective view of the clothes care apparatus according to the embodiment of the disclosure.
Figure 3:
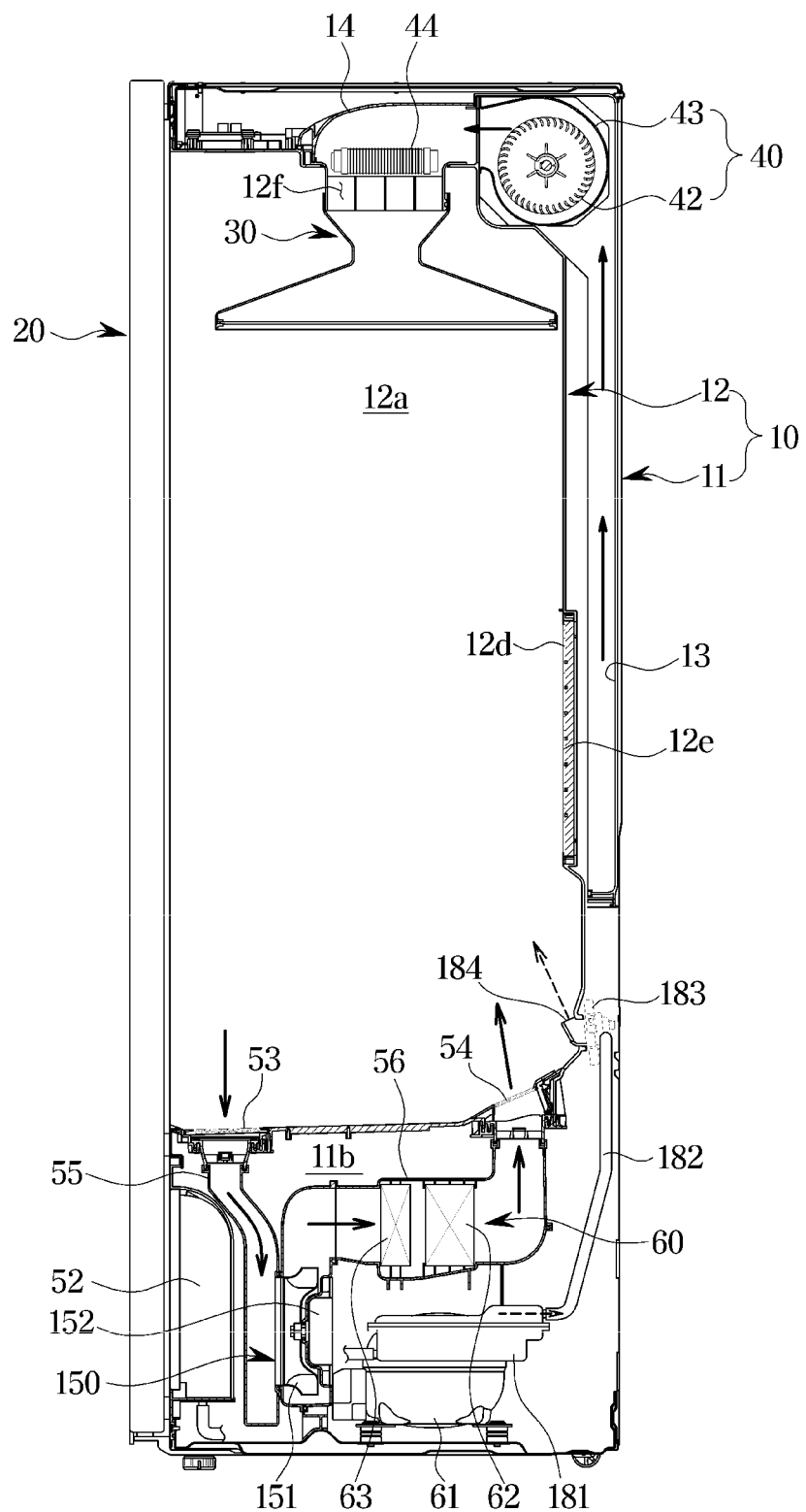
FIG. 3 is a cross-sectional side view of the clothes care apparatus according to the embodiment of the disclosure.

FIG. 1 is a perspective view of a clothes care apparatus according to an embodiment of the disclosure, FIG. 2 is an exploded perspective view of the clothes care apparatus according to the embodiment of the disclosure and FIG. 3 is a cross-sectional side view of the clothes care apparatus according to the embodiment of the disclosure.

As illustrated in FIGS. 1 and 2, a clothes care apparatus 1 may include a body 10, a chamber 12a provided in the body 10 to receive and perform clothes care, a door 20 configured to open and close the chamber 12a by being rotatably coupled to the body 10, and a hanger 30 provided inside the chamber 12a for hanging clothes.

The body 10 may include an outer frame 11, an inner frame 12 installed inside the outer frame 11, and upper ducts 13 and 14 placed between the outer frame 11 and the inner frame 12 to guide air to circulate the air.

The outer frame 11 may be provided in a rectangular parallelepiped shape having a front surface opened to have an inner space 11a.

The inner frame 12 may be placed in the inner space 11a of the outer frame 11. The inner frame 12 may be placed in the inner space 11a to partition a machine room 11b. The inner frame 12 may include the chamber 12a in which a front surface is open and clothes are received.

The machine room 11b may correspond to a part of the inner space 11a and may be separated from the chamber 12a by the inner frame 12. The machine room 11b may be installed under the chamber 12a.

Referring to FIG. 3, the machine room 11b may include a lower heat exchanger 60 constituting a refrigeration cycle. The lower heat exchanger 60 may receive a compressor 61, heat exchangers 62 and 63, and an expansion valve (not shown). The heat exchangers 62 and 63 may include a condenser 62 and an evaporator 63.

The machine room 11b may include a lower blower 150 configured to suck air into the machine room 11b and to introduce air into the chamber 12a from under the chamber 12a. The lower blower 150 may include a lower motor 152 generating a rotational force and a lower fan 151 rotating by the lower motor 152.

The machine room 11b may receive lower ducts 55 and 56 configured to guide the air sucked by the lower fan 151, and a steam generating device 181 (also referred to as steam generator 181) configured to generate steam. The lower fan 151 may be provided as a centrifugal fan that sucks air in the axial direction and discharges air radially outward, but is not limited thereto. In addition, it is illustrated that a single lower fan 151 is provided, but it is not limited thereto, and a plurality of lower fans may be provided according to the design.

The air flowing through the lower fan 151 may be dried through the lower heat exchanger 60 and thus the clothes placed in the chamber 12a may be supplied with dried air from under the chamber 12a. A description thereof will be described later.

The door 20 may be rotatably installed on one side of the front surface of the body 10. The door 20 is rotated to open and close the chamber 12a.

The door 20 may include an inputter 110 configured to allow a user to select an operation of the clothes care apparatus 1. The inputter 110 may be installed on the front surface of the door. The inputter 110 may include a button 110a configured to allow a user to select an operation of the clothes care apparatus 1 by being touched or pushed by the user, and a display 110b configured to display an operation status of the clothes care apparatus 1. Alternatively, without separation between buttons and a display, the inputter 110 may be provided as a display configured to receive a touch input.

The inner frame 12 may include the chamber 12a having a front surface opened, an upper cover 12b forming a space, in which an upper blower 40 is received, above the chamber 12a, and a lower cover 12c extending downward from a front lower end of the chamber 12a and covering the front of the machine room 11b.

That is, the upper blower 40 may be positioned above the chamber 12a and behind the upper cover 12b. The upper blower 40 may include an upper motor 41 configured to generate a rotational force, a pair of upper fans 42 configured to be rotated by the upper motor 41, and a pair of fan cases 43 configured to receive the pair of upper fan 42.

A shaft of the upper motor 41 protrudes toward opposite sides and thus the upper fan 42 each may be coupled to opposite ends of the shaft. With this structure, the pair of upper fans 42 may be rotated by the single upper motor 41. The pair of upper fans 42 may be provided as a centrifugal fan that suctions air in the axial direction and discharges air radially outward, but is not limited thereto. It is illustrated that a pair of upper fans 42 is provided, but it is not limited thereto, and a plurality of upper fans may be provided according to the design.

The pair of fan cases 43 is provided in such a way that an inlet (not shown) is provided on opposite lateral sides thereof and an outlet (not shown) is provided in the front side, and thus the pair of fan cases 43 guides air sucked from the opposite lateral sides, toward the front side.

A water supply tank 58 and a water drain tank 59 (FIG. 2) may be detachably installed on the lower cover 12c. The water supply tank 58 and the water drain tank 59 may be separated from the lower cover 12c, respectively. The water supply tank 58 and the water drain tank 59 may be coupled to the lower cover 12c, respectively. The water supply tank 58 may supply water to the steam generating device 181. The water drain tank 59 may store water that is condensed in such a way that humid air passes through the refrigeration cycle. The position of the water supply tank 58 and water drain tank 59 may vary.

Referring to FIG. 3, a first inlet 12d configured to allow the air in the chamber 12a to flow into the upper ducts 13 and 14 may be provided at the rear surface of the chamber 12a. A filter 12e configured to collect foreign matter such as dust may be provided on the front or rear of the first inlet 12d. A first outlet 12f configured to discharge air of the upper ducts 13 and 14 to the chamber 12a may be provided on the upper surface of the chamber 12a.

When the upper fan 42 rotates, the air inside the chamber 12a may flow into the first upper duct 13 through the first inlet 12d. Foreign matter such as fine dust may be removed by the filter 12e during the air in the chamber 12a flows into the first upper duct 13.

The air flowing into the first upper duct 13 may be moved upward along the first upper duct 13 and suctioned into the upper fan 42. Air discharged from the upper fan 42 may be moved along the second upper duct 14 and discharged into the chamber 12a through the first outlet 12f provided on the upper surface of the chamber 12a.

That is, a lower portion of the first upper duct 13 is connected to a lower rear portion of the chamber 12a, and an upper end of the first upper duct 13 is installed to cover the upper blower 40. The rear end of the second upper duct 14 is connected to the upper blower 40 and the front end of the second upper duct 14 is installed to cover the outer upper surface of the chamber 12a, thereby being connected to the first outlet 12f.

According to an embodiment, the first outlet 12f may include a first internal outlet (not shown) discharging air into the inside of the hanger 30, and a first external outlet (not shown) provided on opposite sides of the first internal outlet (not shown) and configured to discharge air toward the opposite sides of the clothes on the hanger 30.

It is illustrated that a single hanger 30 is provided, but it is not limited thereto, and a plurality of hangers may be provided according to the design, which is provided to allow the clothes to be hanged inside of the chamber 12a. The first outlet 12f may include first internal outlets configured to discharge air to the inside of the hangers, and first external outlets provided among the first internal outlets and the opposite sides of the first internal outlets and configured to discharge air to opposite sides of the clothes on the hanger.

According to an embodiment, an upper heater 44 configured to heat air may be installed inside the second upper duct 14. The upper heater 44 may heat air. As air flowing by the upper fan 42 passes through the upper heater 44, hot air may be discharged into the chamber 12a through the first outlet 12f. FIG. 3 illustrates only the upper heater 44, but the clothes care apparatus 1 may include a heat exchanger (not shown) which is provided to remove moisture on the air flowing by the upper fan 42 (not shown), instead of the upper heater 44. The heat exchanger may include a compressor, a condenser, and an evaporator.

A second inlet 53, a second outlet 54 and a steam outlet 184 may be provided on the upper surface of the machine room 11b that is the lower surface of the chamber 12a. The second inlet 53 may be arranged on the lower front of the chamber 12a. The second outlet 54 and the steam outlet 184 may be arranged on the lower rear side of the chamber 12a. The arrangement of the second inlet 53, the second outlet 54 and the steam outlet 184 may vary.

Air inside the chamber 12a may flow into the first lower duct 55 through the second inlet 53. One end of the first lower duct 55 may be connected to the second inlet 53 and the other end of the first lower duct 55 may be connected to the lower fan 151 of the lower blower 150. The air flowing into the first lower duct 55 may be moved to the second lower duct 56 through the lower fan 151.

The evaporator 63 and the condenser 62 of the lower heat exchanger 60 may be arranged inside the second lower duct 56. The evaporator 63 may absorb heat from the air of the second lower duct 56. The moisture in the air may be condensed by passing through the evaporator 63, and the condensed water may be stored in the water drain tank 59 through a predetermined path.

The condenser 62 may be installed on the downstream side of the evaporator 63 in the air flow path. Air having lowered humidity by passing through the evaporator 63 is heated by passing through the condenser 62. After passing through the evaporator 63 and the condenser 62, a temperature of the air becomes higher and a humidity of the air becomes lower. The hot and dry air may flow in to the chamber 12a through the second outlet 54.

That is, by using the condenser 62 and the evaporator 63 arranged in the second lower duct 56, the lower heat exchanger 60 may remove moisture in the air flowing by the lower fan 151. Therefore, hot and dry air may flow from the lower side of the chamber 12a into the inside of the chamber 12a.

As mentioned above, the air inside the chamber 12a may flow through the second inlet 53 and pass through the refrigeration cycle and then the air may be discharged through the second outlet 54. By using the process, it is possible to dehumidify the inside of the chamber 12a and to dry the clothes.

The machine room 11b may receive the compressor 61 of the lower heat exchanger 60.

According to an embodiment of the disclosure, the compressor 61 may be an inverter compressor capable of changing the rotation speed or the compression capacity. The inverter compressor is capable of changing the compression capacity through the rotation speed control, thereby controlling heat output of the condenser 62.

In addition, the machine room 11b may receive the steam generating device 181. According to an embodiment, the steam generating device 181 may generate steam to be supplied to the chamber 12a and remove the creases of the clothes by supplying the generated steam to the chamber 12a.

The steam generating device 181 may include the water supply tank 58 for storing water and the water supply tank 58 may be removably installed through the lower cover 12c.

The steam generator 181 generates steam by receiving water by being connected to the water supply tank 58, and a steam supply pipe 182 guides the generated steam to a steam injector 183. The steam injector 183 may be arranged at the lower rear portion of the chamber 12a. A heater (not shown) is installed inside the steam generator 181 to heat the water.

The steam generated in the steam generating device 181 moves to the steam injector 183 through the steam supply pipe 182 and may be supplied to the chamber 12a through the steam outlet 184. At this time, the steam outlet 184 may be disposed at the lower rear portion of the chamber 12a and above the second outlet 54.

Figure 4:
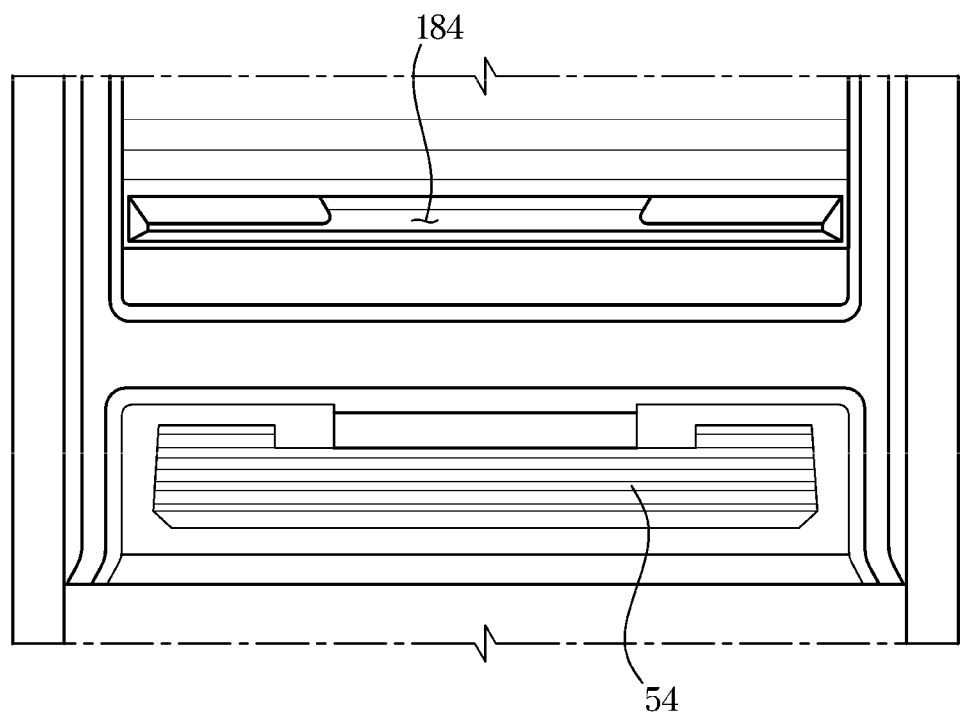
FIG. 4 is a view of a lower portion of a chamber as viewed from the front of the clothes care apparatus according to the embodiment of the disclosure.
Figure 5:
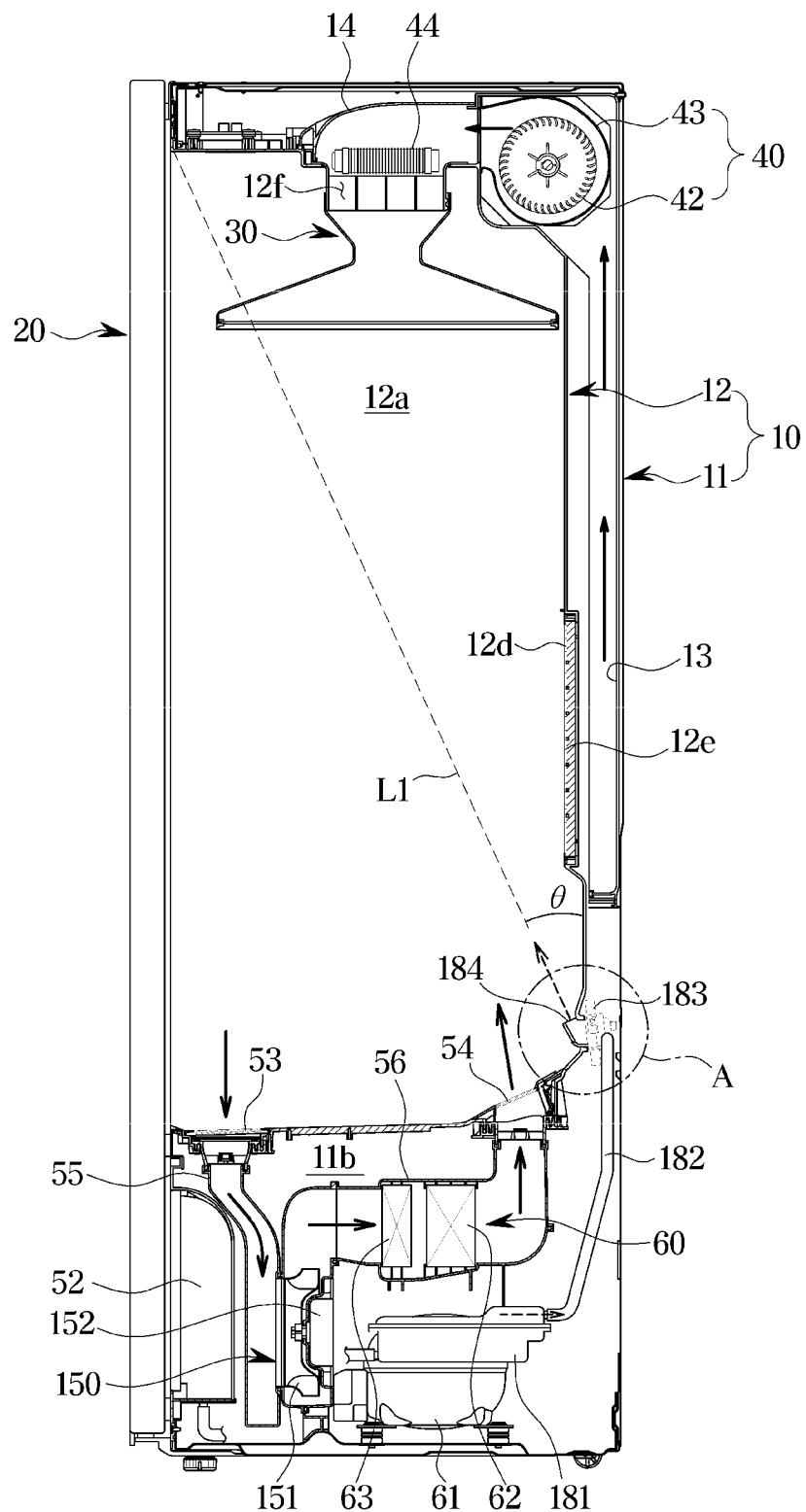
FIG. 5 is a cross-sectional side view illustrating a structure of a steam outlet of the clothes care apparatus according to the embodiment of the disclosure.
Figure 6:
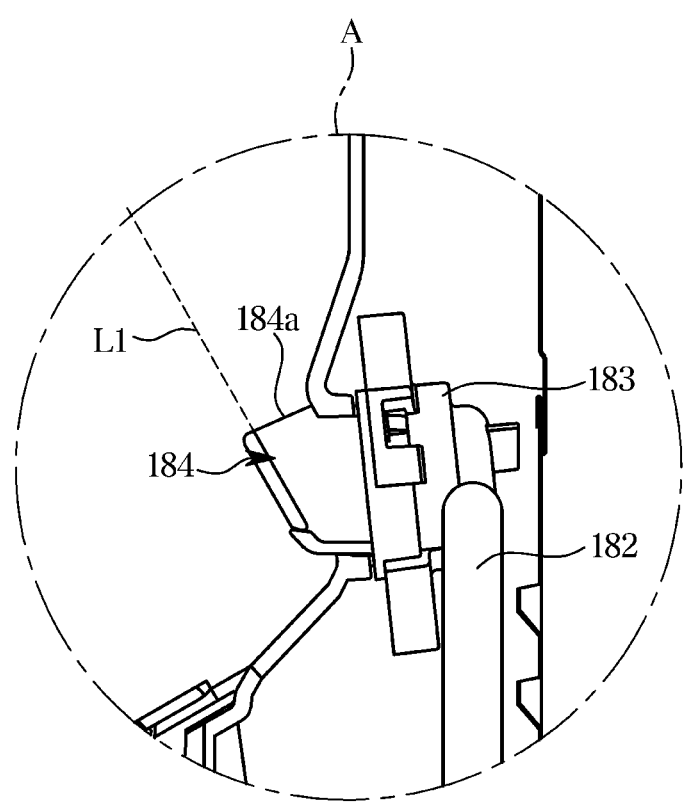
FIG. 6 is an enlarged view of the steam outlet of the clothes care apparatus according to the embodiment of the disclosure.

FIG. 4 is a view of a lower portion of a chamber as viewed from the front of the clothes care apparatus according to the embodiment of the disclosure, FIG. 5 is a cross-sectional side illustrating a structure of a steam outlet of the clothes care apparatus according to the embodiment of the disclosure, FIG. 6 is an enlarged view of the steam outlet of the clothes care apparatus according to the embodiment of the disclosure and FIG. 7 is a table illustrating a water adhesion amount according to an angle of the steam outlet of the clothes care apparatus according to the embodiment of the disclosure.

As illustrated in FIG. 4, the steam outlet 184 of the clothes care apparatus 1 according to an embodiment may be arranged above the second outlet 54.

Particularly, the steam outlet 184 and the second outlet 54 may be located on the same vertical line. In this case, an angle of the steam outlet 184 or a direction of the steam supplied into the chamber 12a by the steam outlet 184 is important to optimize the amount of steam adhering to the clothes.

Referring to FIGS. 5 and 6, the steam outlet 184 of the clothes care apparatus 1 according to an embodiment may be formed to have a predetermined angle θ with respect to the rear surface of the chamber 12a. Particularly, the steam outlet 184 may be formed to be directed to a point where the door 20 is in contact with the upper surface of the chamber 12a, and to an edge where the door 20 is in contact with the upper surface of the chamber 12a. At this time, the steam outlet 184 may be disposed at a lower portion of the rear surface of the chamber 12a.

For example, the steam outlet 184 may be formed to have an angle of 30° with respect to the rear surface of the chamber 12a, and may be formed to be directed to the edge where the door 20 is in contact with the upper surface of the chamber 12a.

As another example, the steam outlet 184 may be formed to have an angle of 45° or more with respect to the lower surface of the chamber 12a, and particularly to have an angle of 60° with respect to the lower surface of the chamber 12a. In this case, the steam outlet 184 may be formed to have an angle of 60° with respect to the lower surface of the chamber 12a while being directed to the edge where the door 20 is in contact with the upper surface of the chamber 12a, but is not limited thereto. As another example, when the steam outlet 184 may be formed to have an angle of 50° or more and 70° or less with respect to the lower surface of the chamber 12a, particularly, an angle of 60° with respect to the lower surface of the chamber 12a.

The steam outlet 184 may be formed in a such way that a vertical line L1 of a surface 184a, on which the steam is supplied from the steam injector 183 to the chamber 12a, is directed to the point where the door 20 and the upper surface of the chamber 12a are in contact with each other, and the steam outlet 184 may be formed to be directed to the edge where the door 20 and the upper surface of the chamber 12a are in contact with each other.

The steam supplied to the chamber 12a through the steam outlet 184 may be injected toward the point where the door 20 and the upper surface of the chamber 12a are in contact with each other and the edge where the door 20 and the upper surface of the chamber 12a are in contact with each other.

For example, the steam supplied to the chamber 12a through the steam outlet 184 may be injected at an angle of 60° with the lower surface of the chamber 12a or at an angle of 30° with the rear surface of the chamber 12a, and the steam supplied to the chamber 12a through the steam outlet 184 may be injected toward the edge where the door 20 and the upper surface of the chamber 12a are in contact with each other.

Therefore, the direction of the steam supplied to the chamber 12a through the steam outlet 184 may be different from the direction of the air flowing into the chamber 12a through the second outlet 54. That is, the direction of the steam supplied to the chamber 12a through the steam outlet 184 may not be parallel with the direction of the air flowing into the chamber 12a through the second discharge port 54.

When the direction of the steam supplied to the chamber 12a through the steam outlet 184 is different from the direction of the air flowing into the chamber 12a through the second discharge port 54, an amount of steam adhering to the clothes may be increased.

As illustrated in FIG. 7, when the steam outlet 184 is arranged at an angle of 50°, the amount of steam adhering to the clothes that is water adhesion amount may be 3.9%, when the steam outlet 184 is arranged at an angle of 60°, the amount of steam adhering to the clothes may be 5.7%, and when the steam outlet 184 is arranged at an angle of 70°, the amount of steam adhering to the clothes may be 3.5%. That is, the amount of steam adhering to the clothes may vary according to the angle and size of the steam outlet 184, and it is possible to optimize the amount of steam adhering to the clothes by using the above mentioned structure of the steam outlet 184. Therefore, because the optimum amount of steam adheres to the clothes, it is possible to improve the clothes care function of the clothes care apparatus, which is performed by using steam and includes creases removal and deodorization.

On the other hand, as the amount of steam is large or the dispersion of steam is active, the amount of water adhering to the clothes may increase, and the amount of water adhering to the clothes may greatly affect the performance of the clothes care apparatus 1. However, a large amount of energy is used in the process of heating the water to generate steam. Therefore, it is important to optimize the amount of water adhering to the clothes by controlling the amount of generated steam and the degree of dispersion of the steam in consideration of the consumed energy.

Hereinafter the operation of the clothes care apparatus 1 according to an embodiment for optimizing the amount of water adhering to clothes will be described in detail.

Figure 8:
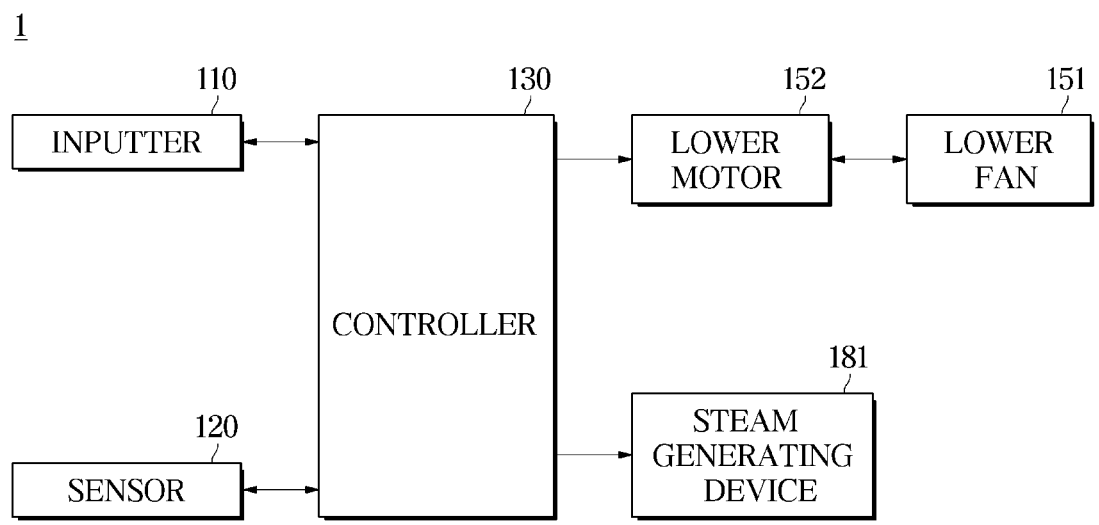
FIG. 8 is a control block diagram of the clothes care apparatus according to the embodiment of the disclosure.

FIG. 8 is a control block diagram of the clothes care apparatus according to the embodiment of the disclosure.

Referring to FIG. 8, the clothes care apparatus 1 according to an embodiment includes the inputter 110, a sensor 120, the lower motor 152, the lower fan 151, the steam generating device 181, and a controller 130 configured to control components in the clothes care apparatus 1.

First, the inputter 110 may receive various inputs from a user. Particularly, the inputter 110 may receive information on a course of the clothes care apparatus 1 from the user. At this time, the course means a series of operation information for the clothes care apparatus 1 to perform the clothes care. The course may include at least one piece of operation period information, and time information of the operation period.

The course of the clothes care apparatus 1 may include a standard course that removes creases and dust in the clothes and sterilizes the clothes by providing steam to the clothes. In addition, the course may include a dust removal course that removes dust in the clothes by providing air to the clothes, and various courses for the clothes care.

According to an embodiment, the clothes care apparatus 1 may provide various courses, and the course may include at least one piece of clothes type information and information on the number of clothes. In addition, the course may include information related to at least one piece of operation period information or operation period time information for each piece of clothes type information and information on the number of clothes.

For example, the course may include at least one of the operation period information or operation period time information that is distinguished based on the clothes type information, and the type of clothes may be classified into a wool material including wool and wool blend, a cotton material including cotton and a cotton blend, a rayon material, a silk material and a polyester material.

As an example, a course for the wool material may include time information such as a time for supplying steam is 2 minutes, a time for dispersing supplied steam is 3 minutes, and a time for stabilizing steam is 0.5 minutes. A course for the cotton material may include time information such as a time for supplying steam is 2 minutes, a time for dispersing supplied steam is 5 minutes, and a time for stabilizing steam is 0.5 minutes. A course for the silk material or the rayon material may include time information such as a time for supplying steam is 0 minutes, a time for dispersing supplied steam is 3 minutes, and a time for stabilizing steam is 0 minutes. The information on the course that is received through the inputter 110 may be used for the control performed by the controller 130 described later.

The sensor 120 may detect a variety of information on the clothes care apparatus 1. Particularly, the sensor 120 may detect temperature information of the clothes care apparatus 1. The sensor 120 may detect a temperature inside the chamber 12a and more particularly, the sensor 120 may detect a temperature of the air in the chamber 12a.

In addition, the sensor 120 may detect a temperature of the steam generator 181. The sensor 120 may detect a temperature of the heater (not shown) provided in the steam generator 181 and may detect a temperature of water that is heated to generate steam For this, the sensor 120 may be implemented as a temperature sensor, but is not limited thereto. The sensor 120 may be implemented as at least one of various sensors such as a weight sensor, a camera sensor, and a dust measuring sensor.

Information obtained by the sensor 120 may be utilized as a control basis of the controller 130 to be described later.

The steam generating device 181 may generate steam by heating the water. The steam generated by the steam generating device 181 may be supplied to the chamber 12a through the steam outlet 184 and the steam may be attached to the clothes accommodated in the chamber 12a to be used for removing creases and deodorizing the clothes.

Next, the lower fan 151 may move the air using the rotational motion. The lower fan 151 may be provided under the chamber 12a and may move the air to the upper side of the chamber 12a. In this case, the lower fan 151 may move air from under the chamber 12a to the inside of the chamber 12a. Hereinafter the description of the lower fan 151 is the same as that of the lower fan 151 described above and thus the description is omitted.

The lower motor 152 may generate a rotational force and transmit the rotational force generated in the lower fan 151 to drive the lower fan 151 to rotate.

The lower motor 152 may allow the air to flow toward the chamber 12a by rotating the lower fan 151. The air moved by the driving of the lower motor 152 may generate airflow inside the chamber 12a. When the steam is supplied into the chamber 12a, the steam may be dispersed inside the chamber 12a due to this airflow.

Hereinafter the description of the lower motor 152 is the same as that of the lower motor 152 described above and thus the description is omitted.

The controller 130 may perform control over the components inside the clothes care apparatus 1. Particularly, the controller 130 may optimize the amount of steam adhering to the clothes by controlling the steam generating device 181 and the lower motor 152.

First, the controller 130 may control on-off states of the steam generating device 181. The controller 130 may turn on the steam generating device 181 to generate steam and control the steam generating device 181 to spray the generated steam.

Particularly, the controller 130 may control the steam generating device 181 to heat the water, and generate steam from the heated water. The controller 130 may control the steam generating device 181 to heat the water until the temperature of the water of the steam generating device 181 obtained by the sensor 120 reaches a predetermined temperature.

For example, the controller 130 may heat the water until the temperature of the heated water reaches 90° C. When the water temperature is 90° C. or higher, the controller 130 may control the amount of steam by stopping heating.

When water is supplemented in the process of heating the water, the controller 130 may temporarily drive the upper motor 41 and thus the air in the chamber 12a may be circulated by the upper fan 42 that is temporarily driven by the upper motor 41. In addition, the controller 130 may control the steam generating device 181 to supply the steam generated by the steam generating device 181 to the chamber 12a.

Particularly, the controller 130 may perform the control such that the steam generated by the steam generator 181 is supplied to the chamber 12a by the steam injector 183. At this time, the steam injector 183 may supply the steam into the chamber 12a through the steam outlet 184. That is, the steam may be injected into the chamber 12a through the steam outlet 184.

The controller 130 may control the steam generating device 181 to supply the generated steam to the inside of the chamber 12a when the temperature of the water of the steam generating device 181 obtained by the sensor 120 reaches a predetermined temperature.

In addition, the controller 130 may supply the generated steam to the inside of the chamber 12a for a predetermined supply time. In this case, the supply time means a period of time in which the steam generated by the steam generating device 181 is supplied into the chamber 12a, and a period of time in which the steam is injected into the chamber 12a.

The controller 130 may determine the supply time based on the information on the course input from the user through the inputter 110, and control the steam generating device 181 to supply the steam into the chamber 12a for the determined supply time.

At this time, the information on the course input from the user may include at least one of the type or the number of the accommodated clothes, and the information may vary according to the type of the number of the accommodated clothes. The controller 130 may determine the supply time based on at least one of the type or number of the accommodated clothes.

The type of clothes may be classified into a wool material including wool and wool blend, a cotton material including cotton and a cotton blend, a rayon material, a silk material and a polyester material.

For example, the controller 130 may determine the supply time based on the type of clothes that is classified by the material. The controller 130 may determine the supply time as 2 minutes when the accommodated clothes is a material which is not sensitive to heat such as a wool material, a cotton material, or a polyester material. When the accommodated clothes are heat-sensitive materials such as a rayon material or a silk material, the controller 130 may determine the supply time as 0 minutes.

As another example, the controller 130 may determine the supply time based on the number of clothes. As the number of clothes increases, the controller 130 may increase the supply time to increase a period time for dispersing the steam.

In addition, the controller 130 may control on/off states of the lower motor 152. The controller 130 may turn on the lower motor 152 to disperse the generated steam and control the lower motor 152 to adjust the degree of dispersion of the steam.

Particularly, the controller 130 may turn on the lower motor 152 such that the steam supplied into the chamber 12a is dispersed by the air moving inside the chamber 12a. At this time, the air moving in the chamber 12a may be the air moving from under the chamber 12a to the inside of the chamber 12a by the lower fan 151, and the air moving to the inside of the chamber 12a through the second outlet 54.

In addition, the controller 130 may adjust the degree of dispersion of the steam in the chamber 12a by controlling at least one of a driving time and a driving speed of the lower motor 152.

The controller 130 may control the driving of the lower motor 152 based on the temperature inside the chamber 12a obtained by the sensor 120.

Particularly, the controller 130 may drive the lower motor 152 until the detected temperature of the inside of the chamber 12a reaches a predetermined temperature. The controller 130 may turn off the lower motor 152 when the detected temperature of the inside of the chamber 12a reaches the predetermined temperature.

In other words, the controller 130 may drive the lower motor 152 from when the steam starts to be supplied to the chamber 12a until the temperature of the inside of the chamber 12a reaches the predetermined temperature. Therefore, the steam supplied to the chamber 12a may be dispersed and adhere to the clothes.

In addition, the controller 130 may turn off the steam generating device 181 when the temperature of the inside of 12a reaches the predetermined temperature. As a result, damage to clothes due to the high temperature may be prevented in advance.

The controller 130 may drive at least one of the upper motor 41 and the lower motor 152 such that the generated steam is dispersed in the chamber 12a.

In other words, the controller 130 may rotate the upper motor 41 such that the generated steam is dispersed through the air moved by the upper fan 42, and rotate the lower motor 152 such that the generated steam is dispersed through the air moved by the lower fan 151. Alternatively, the controller 130 may disperse the steam by driving the upper motor 41 and the lower motor 152 simultaneously.

The controller 130 may stabilize the air flow inside the clothes care apparatus 1 to attach the steam to the clothes, and for this, the controller 130 may control at least one of the steam generating device 181 and the lower motor 152 to be turned off.

Particularly, the controller 130 may suppress the movement of the air inside the chamber 12a such that the steam adhering to the clothes is stabilized or the steam dispersed in the chamber 12a adheres to the clothes. The controller 130 may turn off the steam generating device 181 and the lower motor 152 to suppress the movement of the air inside the chamber 12a such that the steam adhering to the clothes permeates the clothes or the steam in the air adheres to the clothes.

Therefore, the function of the clothes care apparatus 1 may be expected to be improved by increasing the amount of steam adhering to the clothes.

In addition, the controller 130 may drive the lower motor 152 or the steam generating device 181 after stabilizing the air flow inside the clothes care apparatus 1.

After stabilizing the inside of the air flow, the controller 130 may drive at least one of the lower motor 152 or the upper motor 41 to allow at least one of the lower fan 151 or the upper fan 42 to rotate.

Alternatively, the controller 130 may allow both the lower fan 151 and the upper fan 42 to rotate by simultaneously driving the lower motor 152 and the upper motor 41.

The controller 130 may be implemented by a memory (not shown) for storing an algorithm for controlling an operation of the components in the clothes care apparatus 1 or data about programs that is implemented algorithm, and a processor (not shown) performing the above mentioned operation by using the data stored in the memory. The memory and the processor may be implemented as separate chips. Alternatively, the memory and the processor may be implemented on a single chip.

The memory may be implemented by at least one of a non-volatile memory such as a cache, a read only memory (ROM), a programmable ROM (PROM), an erasable programmable ROM (EPROM), an electrically erasable programmable ROM (EEPROM), or a flash memory, a volatile memory such as a random access memory (RAM) or a storage medium such as a hard disk drive (HDD) or CD-ROM, but is not limited thereto.

At least one component corresponding to the performance of the components of the clothes care apparatus 1 illustrated in FIG. 8 may be added or omitted. It will be readily understood by those skilled in the art that the mutual position of the components can be changed corresponding to the performance or structure of the system.

Each of the components illustrated in FIG. 8 refers to software and/or hardware components such as field programmable gate array (FPGA), and application specific integrated circuits (ASIC).

Figure 9:
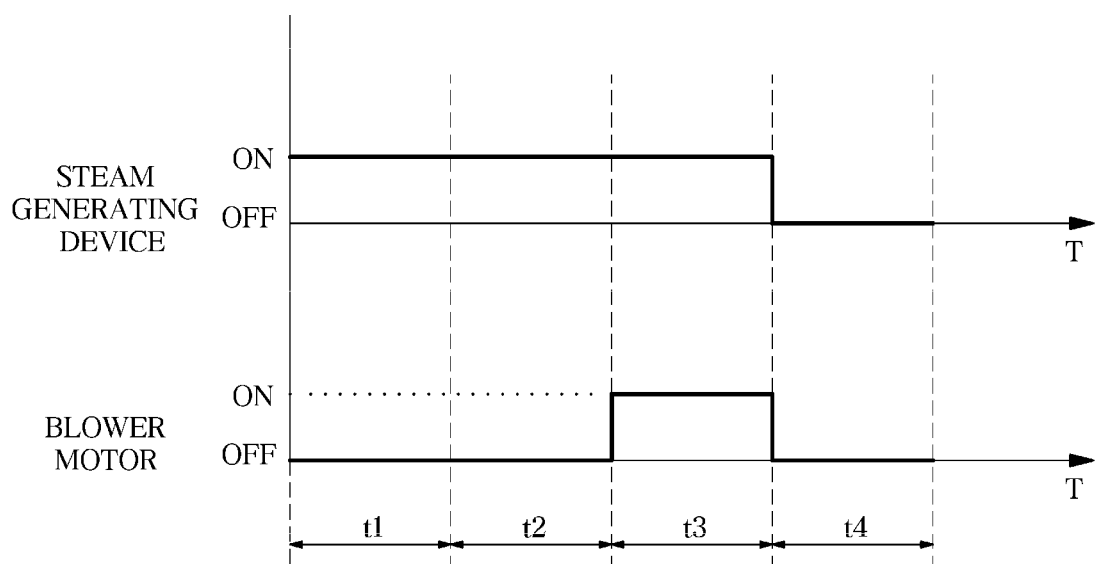
FIG. 9 is a graph illustrating an operation of the clothes care apparatus according to the embodiment of the disclosure.

FIGS. 9 and 10 are views illustrating an operation of the clothes care apparatus according to the embodiment of the disclosure.

Referring FIGS. 9 and 10, the controller 130 according to an embodiment may control at least one on-off state of the steam generating device 181 or the lower motor 152 based on at least one operation period, and control the drive of the steam generating device 181 or the lower motor 152.

At this time, the plurality of operation periods may include a first period for period generating steam, a second period for supplying the generated steam to the chamber 12a, a third period for dispersing the supplied steam, and a fourth period for attaching the dispersed steam to the clothes or stabilizing the steam adhering to the clothes.

In the first period for generating steam, the controller 130 may generate the steam by turning on the steam generating device 181. The controller 130 may heat the water for a time t1 that is a period of time until the temperature of the heated water reaches a predetermined temperature after the steam generating device 181 is turned on.

For example, the controller 130 may allow the water to be heated for one minute, allow the steam generating device 181 to be in an on state, and allow the lower motor 152 to be in an off state.

In the second period for supplying the generated steam to the chamber 12a, the controller 130 may control the steam generating device 181 such that the generated steam is supplied to the inside of the chamber 12a. The controller 130 may allow the steam generating device 181 to supply the steam to the inside of the chamber 12a for a predetermined supply time t2.

The predetermined supply time t2 may be determined based on the information about the course input from the user through the inputter 110.

The information about the course may include at least one of the type or number of the accommodated clothes, and the information may vary according to the type of the number of the accommodated clothes. The controller 130 may determine the supply time based on at least one of the type or number of the accommodated clothes.

The type of clothes corresponding to the type classified by a material of the clothes may be classified into a wool material including wool and wool blend, a cotton material including cotton and a cotton blend, a rayon material, a silk material and a polyester material.

For example, the controller 130 may determine the supply time based on the type of clothes that is classified by the material. The controller 130 may determine the supply time as 2 minutes when the accommodated clothes is a material which is not sensitive to heat such as a wool material, a cotton material, or a polyester material. When the accommodated clothes are heat-sensitive materials such as a rayon material or a silk material, the controller 130 may determine the supply time as 0 minutes.

As another example, the controller 130 may determine the supply time based on the number of clothes. As the number of clothes increases, the controller 130 may increase the supply time to increase a period time for dispersing the steam.

The controller 130 may control the steam generating device 181 to supply the steam into the chamber 12a for the determined supply time t2.

For example, the controller 130 may supply the steam into the chamber 12a for 2 minutes. The steam generating device 181 may be maintained in the on state, and the lower motor 152 may be maintained in the off state.

In the third period for dispersing the supplied steam, the controller 130 may turn on the lower motor 152 such that the steam is dispersed in the chamber 12a. The controller 130 may allow the steam generating device 181 to be in the on state such that the steam is continuously supplied into the chamber 12a.

The controller 130 may turn on the lower motor 152 for a time t3 that is a period of time until the temperature inside the chamber 12a reaches a predetermined temperature after the lower motor 152 is turned on. That is, the controller 130 may disperse the steam supplied into the chamber 12a for the time t3 until the predetermined temperature is reached.

At this time, the operation time t3 of the third period may vary based on the amount of the generated steam. The operation time t3 of the third period may increase as the amount of the generated steam or the amount of steam supplied to the inside of the chamber 12a increases. In other words, the operation time t3 of the third period may increase as the operation time t1 of the first period or the operation time t2 of the second period increases.

For example, the controller 130 may disperse the steam in the chamber 12a for 5 minutes in the third period. The controller 130 may allow the steam generating device 181 and the lower motor 152 to be in the on state.

In the fourth period for attaching the dispersed steam to the clothes or stabilizing the steam adhering to the clothes, the controller 130 may turn off the steam generating device 181 and the lower motor 152 for a predetermined stabilization time t4.

At this time, the operation time t4 of the fourth period may vary based on the amount of the generated steam. The operation time t4 of the fourth period may increase as the amount of the generated steam or the amount of steam supplied to the inside of the chamber 12a increases. In other words, the operation time t4 of the fourth period may increase as the operation time t1 of the first period or the operation time t2 of the second period increases.

The controller 130 may stabilize the steam by suppressing the movement of the air inside the chamber 12a for the predetermined stabilization time t4 such that the dispersed steam adheres to the clothes or the steam adhering to the clothes permeates the clothes.

For example, the controller 130 may control the steam generating device 181 and the lower motor 152 to be in the off state for 0.5 minute in the fourth period.

Accordingly, it is possible to generate an appropriate amount of steam, and to supply the steam to inside of the chamber 12a and to disperse the supplied steam by at least one operating period. Therefore, because the optimum amount of steam adheres to the clothes, it is possible to improve the clothes care function of the clothes care apparatus, which is performed by using steam and includes creases removal and deodorization.

Figure 11:
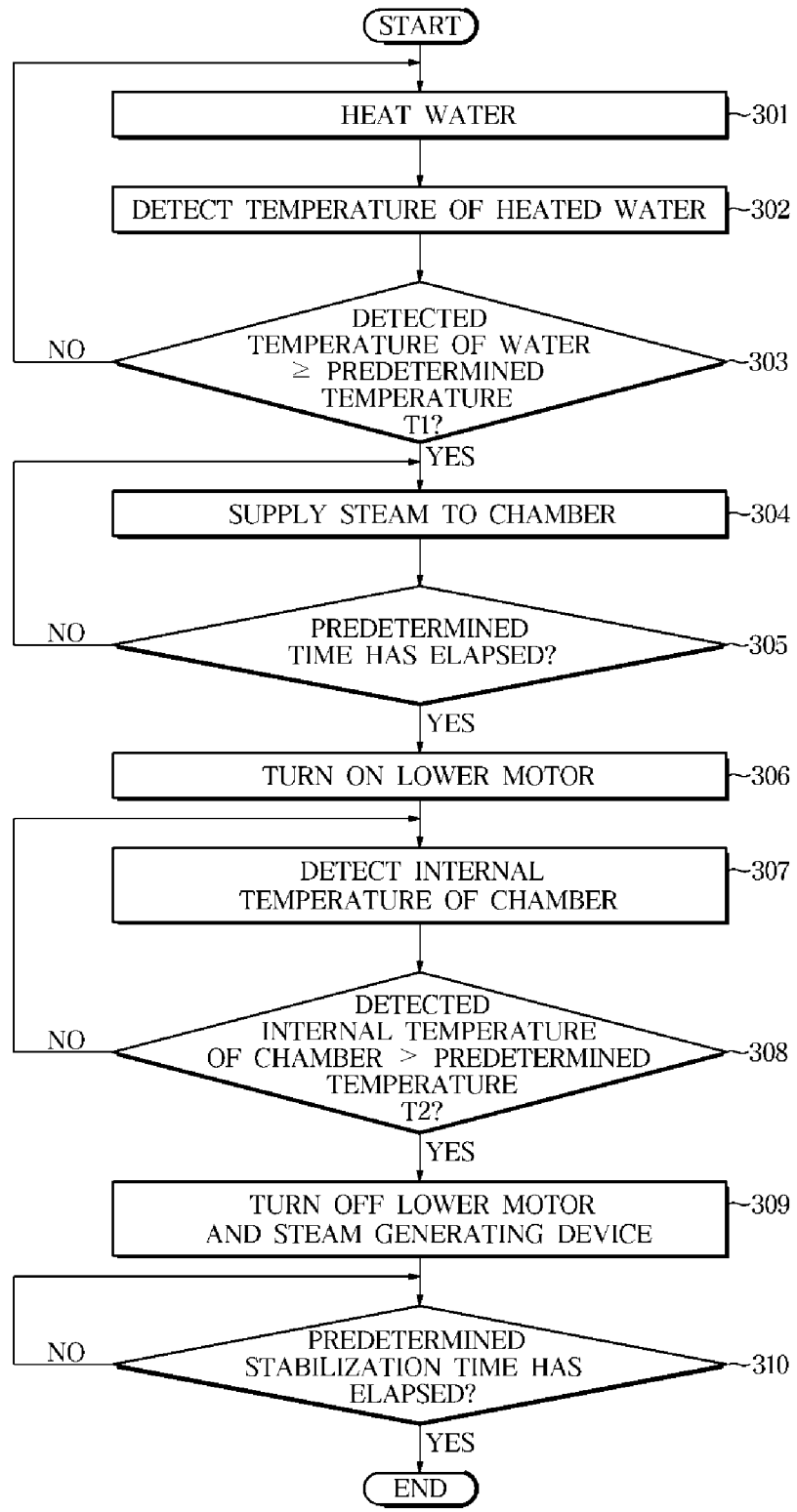
FIG. 11 is a flow chart of a control method of the clothes care apparatus according to the embodiment of the disclosure.

FIG. 11 is a flow chart of a control method of the clothes care apparatus according to the embodiment of the disclosure.

Referring to FIG. 11, the clothes care apparatus 1 according to an embodiment may heat water (301) and generate steam from the heated water. Particularly, the clothes care apparatus 1 may heat the water by turning on the steam generating device 181.

When water is supplemented in the process of heating the water, the clothes care apparatus 1 may temporarily drive the upper motor 41, and the air inside the chamber 12a may be circulated by the upper fan 42 that is temporarily driven by the upper motor 41.

Thereafter, the clothes care apparatus 1 may detect the temperature of the heated water (302) and identify whether the detected temperature of the water is equal or higher than a predetermined temperature (T1) (303).

When the detected temperature of the water is equal or higher than the predetermined temperature T1 (yes in 303), the clothes care apparatus 1 may supply the steam to the chamber 12a (304). Particularly, the clothes care apparatus 1 may control the steam generating device 181 to supply the steam to the chamber 12a, and control the steam generating device 181 to maintain the on state.

Thereafter, the clothes care apparatus 1 may confirm whether or not a predetermined supply time has elapsed (305). In this case, the supply time means a period of time in which the steam generated by the clothes care apparatus 1 is supplied into the chamber 12a, and a period of time in which the steam is injected into the chamber 12a.

The clothes care apparatus 1 may determine the supply time based on the information on the course input from the user. The information on the course input from the user may vary according to the type of the number of the accommodated clothes. The clothes care apparatus 1 may determine the supply time based on at least one of the type or number of the accommodated clothes. For example, the type of clothes may be classified into a wool material including wool and wool blend, a cotton material including cotton and a cotton blend, a rayon material, a silk material and a polyester material. The controller 130 may determine the supply time based on the type of clothes that is classified by the material.

For example, the controller 130 may determine the supply time as 2 minutes when the accommodated clothes is a material which is not sensitive to heat such as a wool material, a cotton material, or a polyester material. When the accommodated clothes are heat-sensitive materials such as a rayon material or a silk material, the controller 130 may determine the supply time as 0 minutes.

As another example, the controller 130 may determine the supply time based on the number of clothes. As the number of clothes increases, the controller 130 may increase the supply time to increase a period time for dispersing the steam.

When the predetermined supply time has elapsed (yes in 305), the clothes care apparatus 1 may turn on the lower motor 152 (306).

Particularly, the clothes care apparatus 1 may turn on the lower motor 152 such that the steam supplied into the chamber 12a is dispersed by the air moving inside the chamber 12a. At this time, the air moving inside the chamber 12a may be air moving from under the chamber 12a to the inside of the chamber 12a by the lower fan 151, or air moving to the inside of the chamber 12a through the second outlet 54.

The clothes care apparatus 1 may detect the temperature of the inside of the chamber 12a (307) and identify whether the temperature of the inside of the chamber 12a is equal to or higher than a predetermined temperature T2 (308).

When the detected temperature inside the chamber 12a is equal to or higher than the predetermined temperature T2 (yes in 308), the clothes care apparatus 1 may turn off the lower motor 152 and the steam generating device 181 (309).

The clothes care apparatus 1 may identify whether or not a predetermined stabilization time has elapsed (310) and the clothes care apparatus 1 may maintain the lower motor 152 and the steam generating device 181 at the off state until the predetermined stabilization time has elapsed. For the predetermined stabilization time, the clothes care apparatus may suppress the movement of the air inside the chamber 12a such that the steam adhering to the clothes is stabilized or the steam dispersed in the chamber 12a adheres to the clothes.

As a result, an appropriate amount of steam may be generated, and the generated steam may be efficiently attached to the clothes and thus an optimum amount of steam may be attached to the clothes in consideration of the consumed energy. Accordingly, the clothes care function using steam may be improved, and the user's convenience can be increased.

As is apparent from the above description, a clothes care apparatus may improve the clothes care function using steam and increase the user's convenience because an optimum amount of steam is attached to the clothes.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A clothes care apparatus comprising:
a chamber;
a fan coupled to the chamber and configured to move air to an upper part of the chamber;
a motor configured to rotate the fan;
a steam generator configured to generate steam;
a steam outlet provided in the lower part of the chamber;
a steam injector provided to supply the steam into the chamber through the steam outlet;
a steam supply pipe to move the steam generated by the steam generator to the steam injector;

an inputter configured to receive information on a clothes care course from a user;

a sensor configured to detect a temperature inside the chamber, and a controller configured to control on-off states of the steam generator and the motor, and configured to:

determine a supply time for the steam generator to supply the generated steam to the chamber, based on the information on the clothes care course;

turn on the steam generator to supply the steam to the chamber;

based on the steam generator having been operated for the supply time, turn on the motor to disperse the steam by controlling the motor to cause the fan to move the air to the upper part of the chamber; and turn off the steam generator and the motor based on the temperature detected by the sensor reaching a predetermined temperature.

2. The clothes care apparatus of claim 1, wherein the steam generator is configured to generate steam by heating water, further comprising a water sensor configured to detect a temperature of the water, wherein the controller is configured to control the steam generator to heat the water until the detected temperature of the water reaches a predetermined water temperature.

3. The clothes care apparatus of claim 1, wherein the information on the clothes care course comprises at least one of the type or the number of the clothes to be accommodated in the chamber.

4. The clothes care apparatus of claim 1, wherein the controller is configured to turn on the motor for a dispersion time and to then turn off the steam generator and the motor for a predetermined stabilization time.

5. The clothes care apparatus of claim 1, wherein the controller is configured to turn off the steam generator and the motor so that the dispersed steam adheres to the clothes.

6. The clothes care apparatus of claim 1, further comprising:

a door configured to open and close the chamber, wherein the steam outlet is configured to be directed to a point where the door is in contact with an upper surface of the chamber.

7. The clothes care apparatus of claim 6, wherein the steam supplied to the chamber through the steam outlet is injected to be directed to an edge where the door is in contact with the upper surface of the chamber.

* * * * *